US007398871B1

(12) United States Patent
Basgil et al.

(10) Patent No.: US 7,398,871 B1
(45) Date of Patent: Jul. 15, 2008

(54) OUTSERT PLACER

(76) Inventors: Thomas M. Basgil, 602 Woodland Ave., Cinnaminson, NJ (US) 08077; James A. Esposito, 87 Jennifer Ln, Burlington, NJ (US) 08016; Eric Anderson, 50 Lake Dr., Beverly, NJ (US) 08010; John Cooper, III, 117 Revere Dr., Deptford, NJ (US) 08096

( * ) Notice: Subject to any disclaimer, the term of this patent is extended or adjusted under 35 U.S.C. 154(b) by 0 days.

(21) Appl. No.: 11/652,331

(22) Filed: Apr. 13, 2007

Related U.S. Application Data

(60) Provisional application No. 60/757,970, filed on Jan. 11, 2006.

(51) Int. Cl.
*B65G 47/84* (2006.01)

(52) U.S. Cl. ................................ 198/473.1; 198/478.1

(58) Field of Classification Search ............. 198/469.1, 198/470.1, 473.1, 478.1, 479.1, 480.1, 481.1
See application file for complete search history.

(56) References Cited

U.S. PATENT DOCUMENTS

| | | | | | |
|---|---|---|---|---|---|
| 5,056,650 | A | * | 10/1991 | Kronseder | 198/473.1 |
| 5,082,105 | A | * | 1/1992 | Tincati | 198/473.1 |
| 5,336,359 | A | * | 8/1994 | Pituch et al. | 156/568 |
| 5,373,934 | A | * | 12/1994 | Jackson et al. | 198/480.1 |
| 5,533,608 | A | * | 7/1996 | Adams et al. | 198/478.1 |
| 5,540,320 | A | * | 7/1996 | Sarto et al. | 198/473.1 |
| 5,772,001 | A | * | 6/1998 | Otruba et al. | 198/481.1 |
| 6,374,989 | B1 | * | 4/2002 | van Dyke et al. | 198/478.1 |

* cited by examiner

*Primary Examiner*—James R. Bidwell
(74) *Attorney, Agent, or Firm*—Donald C. Simpson

(57) ABSTRACT

An adjustable star wheel device for the indexing of items of differing sizes for use in a manufacturing process such as the attaching of outserters to containers.

2 Claims, 8 Drawing Sheets

OUTSERT PLACER

Priority for this application is claimed from Provisional Patent Application No. 60/757,970 filed Jan. 11, 2006.

FIELD OF THE INVENTION

The present invention relates to packaging equipment and, more particularly, to a system for applying literature, such as folded matter, to the outside of a container.

BACKGROUND OF THE INVENTION

Packaging equipment is commonly used for the filling of containers, the closure of the containers, and the labeling of containers. Examples of containers in frequent use are the bottles or boxes found on the shelves in the marketplace. The bottles are used to package food and other items for both the home and in industry. Such packages are provided with labels to identify the contents of the package, as well as to provide instructions in the use of the material contained within the package.

A problem arises in that there are occasions wherein there is insufficient room on a package label to provide all of the necessary data and instructions on the use of the material contained within the package. For example, in the distribution of medicinal products, literature or "outserts" in the nature of a multifolded paper are attached to the package; unlike the usual label, such multifolded paper has adequate space to fully describe the material being packaged and/or its use. The outsert has the description of the drug, side effects and all of the necessary legal information that must be provided by the pharmaceutical company to the end user. However, the securing of literature, such as the foregoing multifolded paper or a brochure of bound sheets of paper, is not readily accomplished by the type of mechanism utilized for applying a simple, single layer label. The bulkiness of the literature and its tendency to open, necessitates the use of specially constructed equipment which can handle the folded or bound literature. The known literature-applying machines have a number of problems. One such system is described in U.S. Pat. No. 4,853,063 which utilizes a web of pressure sensitive tape to move literature from a literature magazine to the target container. Web breaks and adjustment of the literature stop pins create constant attendance. Tension of the web is critical because too much tension causes web breaks, while not enough tension may cause the web to sag.

An additional problem with prior art outserters centers on the step of removing the literature from a magazine hopper and placing it on the web in a consistent manner. Such conventional literature-applying machines use a reciprocating or rotary mechanism that takes the literature out of a hopper using a vacuum, turns the literature at an angle of 90 degrees with respect to the web, and then releases the vacuum, thus adhering the literature to the web. One such machine utilizes a vacuum star wheel to pull the outsert out of a magazine hopper. However, this type of mechanism does not apply the literature to the web with consistent accuracy, and must be rebuilt frequently due to constant mechanical wear. Literature may also be applied to containers using glue machines. The literature is removed from a hopper and placed on a rotary drum. The drum holds the literature by vacuum and is rotated to a station that applies glue to the back of the literature. The drum is then rotated to another station where the literature is applied directly onto a container. This method of applying a piece of literature to the container, however, is messy and inaccurate. In an alternative to this procedure, a container is positioned on a platform that is eccentric. The hotmelt glue is applied to the side of the container. When the containers nears the outsert, dual feed screws accelerate the outsert to meet the glue on the containers. When the containers nears the outsert, the container is rotated on the platform and the glue pulls the outsert out of the hopper. In this method the container actually hits the outsert at the magazine discharge and the only thing that actually pulls the outsert out of the hopper is the adhesive strength of the glue. The system described in detail in U.S. Pat. No. 5,336,359 (the disclosure of which is incorporated herein by reference) overcomes many of the disadvantages inherent in the above described literature-applying machines by providing a rotatable member which receives literature from a hopper and is rotated to a station that applies the literature to an adhesively coated web. The rotatable member of that device is rotated such that only a single piece of literature is received by each literature receiving area on the rotatable member. The system includes a hopper having an exit for dispensing literature one piece at a time and a rotatable member having a plurality of literature-receiving areas disposed around the periphery thereof. Each literature-receiving area receives one piece of literature from the exit. The member is positioned such that a portion of the periphery thereof is in facing relationship with the exit of the hopper for allowing one of the literature-receiving areas to be aligned with the exit for receiving the one piece of dispensed literature. Drive means is drivingly associated with the member for rotating the member in a first direction such that the literature-receiving areas pass by the exit one at a time to correspondingly receive a piece of literature from the exit of the hopper. A web having an adhesive coating on one side thereof is provided for receiving and carrying pieces of literature. Guide means guide the web past a literature-receiving area of the member having a terminal piece of literature positioned thereon such that the adhesive coating on the web is in facing relationship with the terminal piece of literature. First transfer means transfers the terminal piece of literature from the literature-receiving area having the terminal piece of literature therein into adhering contact with the adhesive coating on the web. Moving means moves the web past the first transfer means toward an object which is to receive a piece of literature. Second transfer means transfers a piece of literature from the web to the object. Means receive the web after removal of literature therefrom by the second transfer means.

BRIEF SUMMARY OF THE INVENTION

The outserter of the present invention is an electro-mechanical system used by the pharmaceutical industry to automatically apply an outsert (professional information brochure) to the outside of a pharmaceutical container without the need for webs, pressure sensitive tapes, a vacuum wheel or a vacuum star to deliver the ousert from the outsert magazine to the designated container. Instead, this outserter utilizes a star wheel designed to extract outserts out of the hopper magazine without vacuum. Once the outsert is extracted, the star accelerates the outsert to match the velocity of the container to which it is to be adhered. Hotmelt glue is applied to the target side of the designated container or, alternatively, to the leading face of the extracted outsert and the two are brought into contact with each other to complete the outsert placement and attachment. The outsert placer can be an added option for and/or retrofit to a rotary or in-line labeling system.

DESCRIPTION OF THE PREFERRED EMBODIMENT

Figure 1:
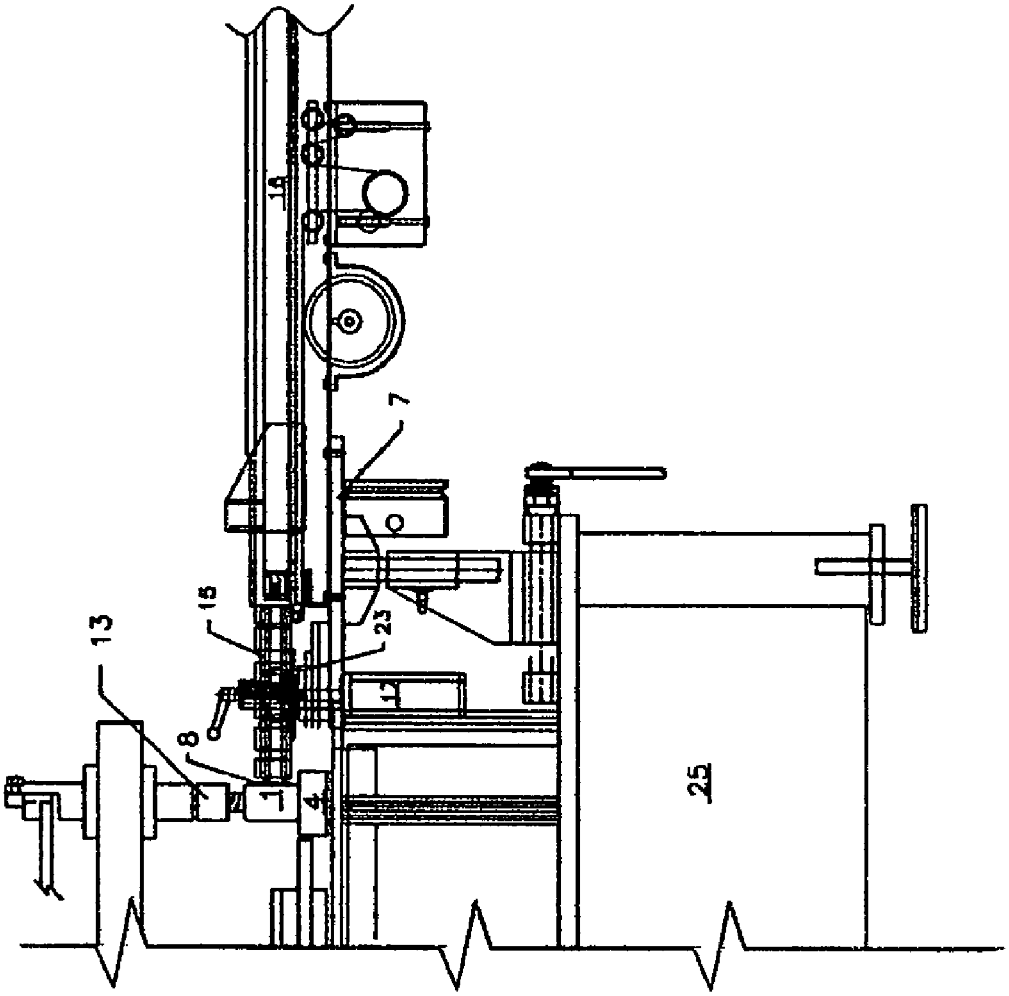
FIG. 1 is a fragmentary side elevational view of an outsert placer constructed in accordance with the teachings of this invention.
Figure 2:
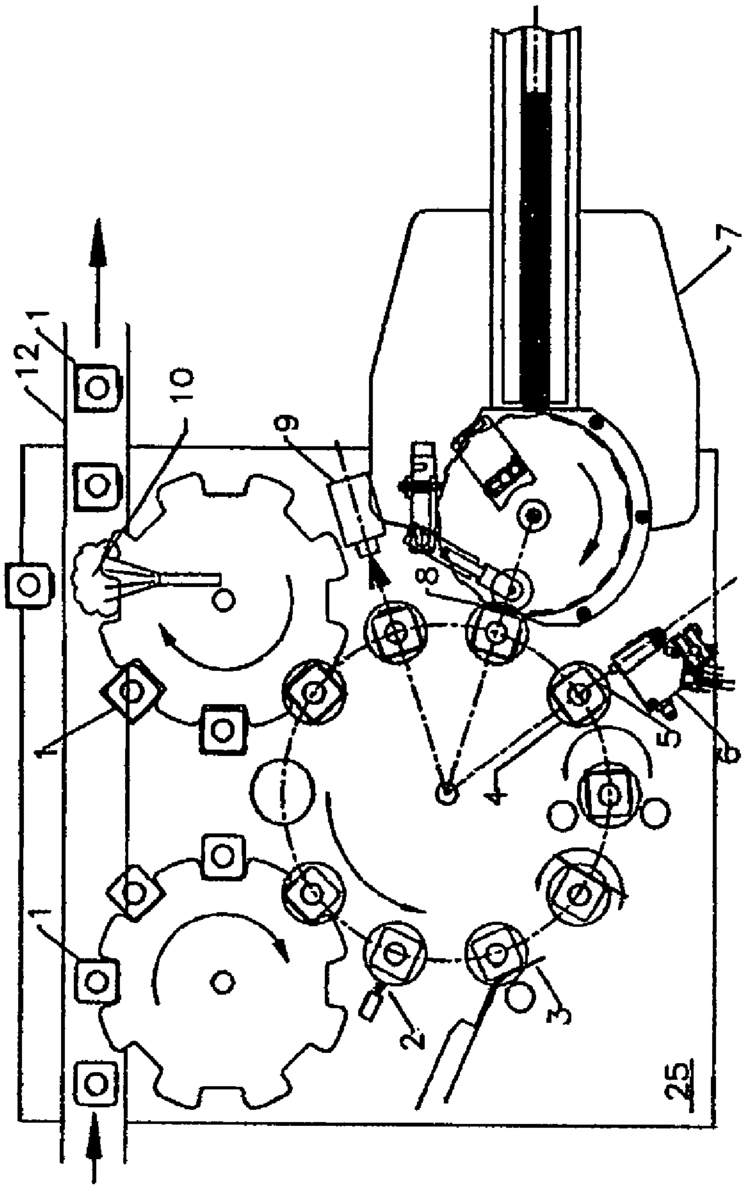
FIG. 2 is a top plan view of the outsert placer of FIG. 1 installed adjacent to a conveyor line for outsert application to containers on such line.
Figure 3:
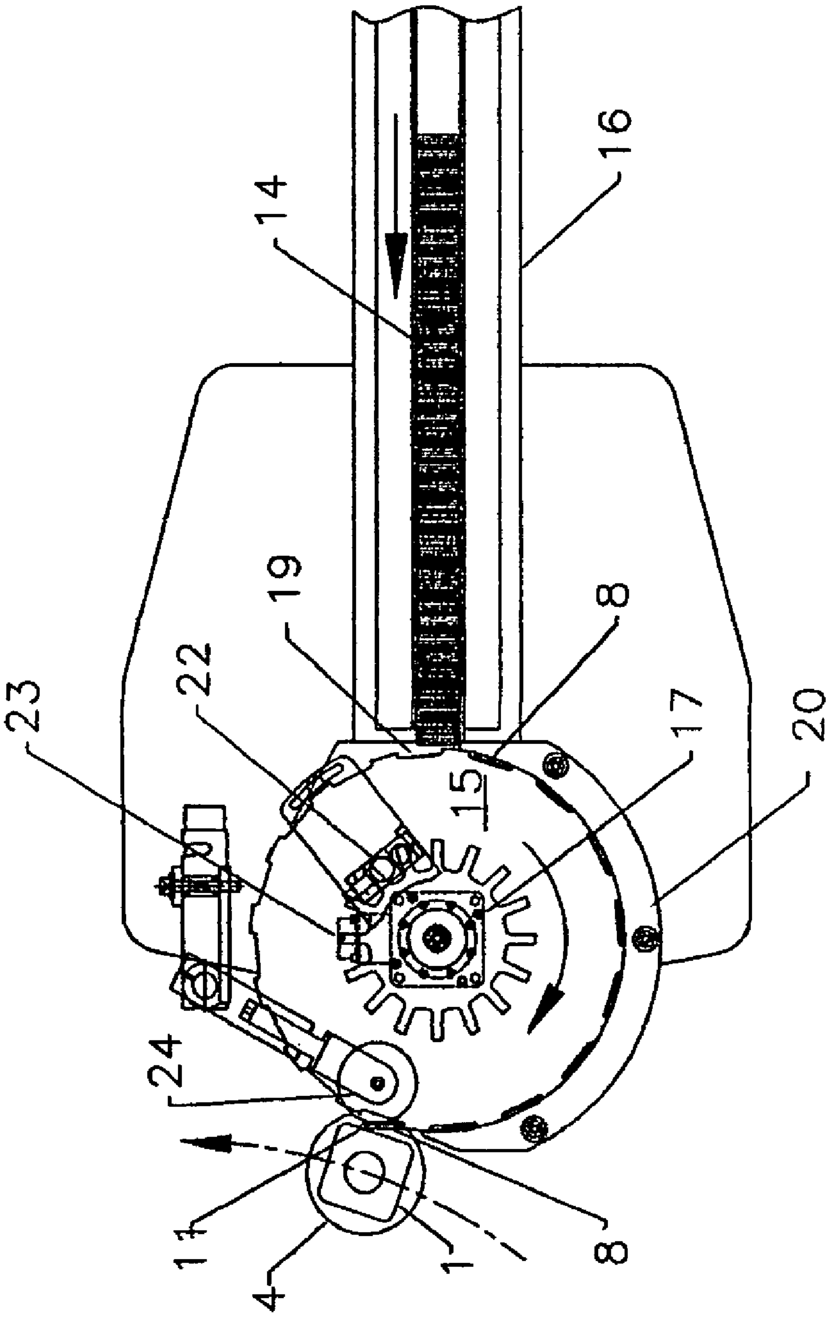
FIG. 3 is an enlarged, detailed, fragmentary view as shown in FIG. 2.

FIGS. 1 and 2 show the outserter as used with a rotary labeling machine. As the container enters a rotary labeling machine (25), a top hold device (13) applies downward pressure to a container (1) that is sitting on a high grip rubber platform (4). The container (1) is detected by a photoelectric device (2) and tracked by the machine controller through the system. The container is first labeled (3) as the container travels through the machine. The container is then positioned by rotation of the platform (4) to the appropriate orientation to receive the outsert. It then reaches the location where two beads of hot-melt glue are applied (5) by an air operated automatic glue head (6). Traveling another 36 degrees, the container reaches the outsert placer (7). Here the outsert (8) is applied to the side of the container and held in place by the hot-melt glue. Applying glue to the outsert instead of the container is an optional method. Traveling another 36 degrees the outsert is inspected by the inspection device (9) and determined to be accepted or rejected. Upon exiting the machine the container (1) with the outsert applied is either rejected with an air blast (10) or proceeds down the conveyor (12) as a good container (1). As can be seen with greater clarity in FIG. 3, outserts (8) are delivered in bulk to the star wheel (15) by means of a feeder mechanism (16). The star wheel is driven by a servo motor (17) mounted directly under the star wheel. The outserts (8) are separated individually in the pockets (19) of the star wheel and held in place by guides (20). The outserts (8) are indexed to the application point (11) at a matched velocity of the container (1) ensuring a smooth transition from star wheel to the container (1) via the servo motor. The start/stop position of the star wheel is adjustable by rotating the star home sensor (22) as it registers one of the teeth of the home sensor star (23) and the outsert (8). The outsert is applied to the side of the container, which has had hot-melt glue previously applied, by the force of a pressure wheel (24).

ADJUSTABLE OUTSERT STARWHEEL

Figure 4:
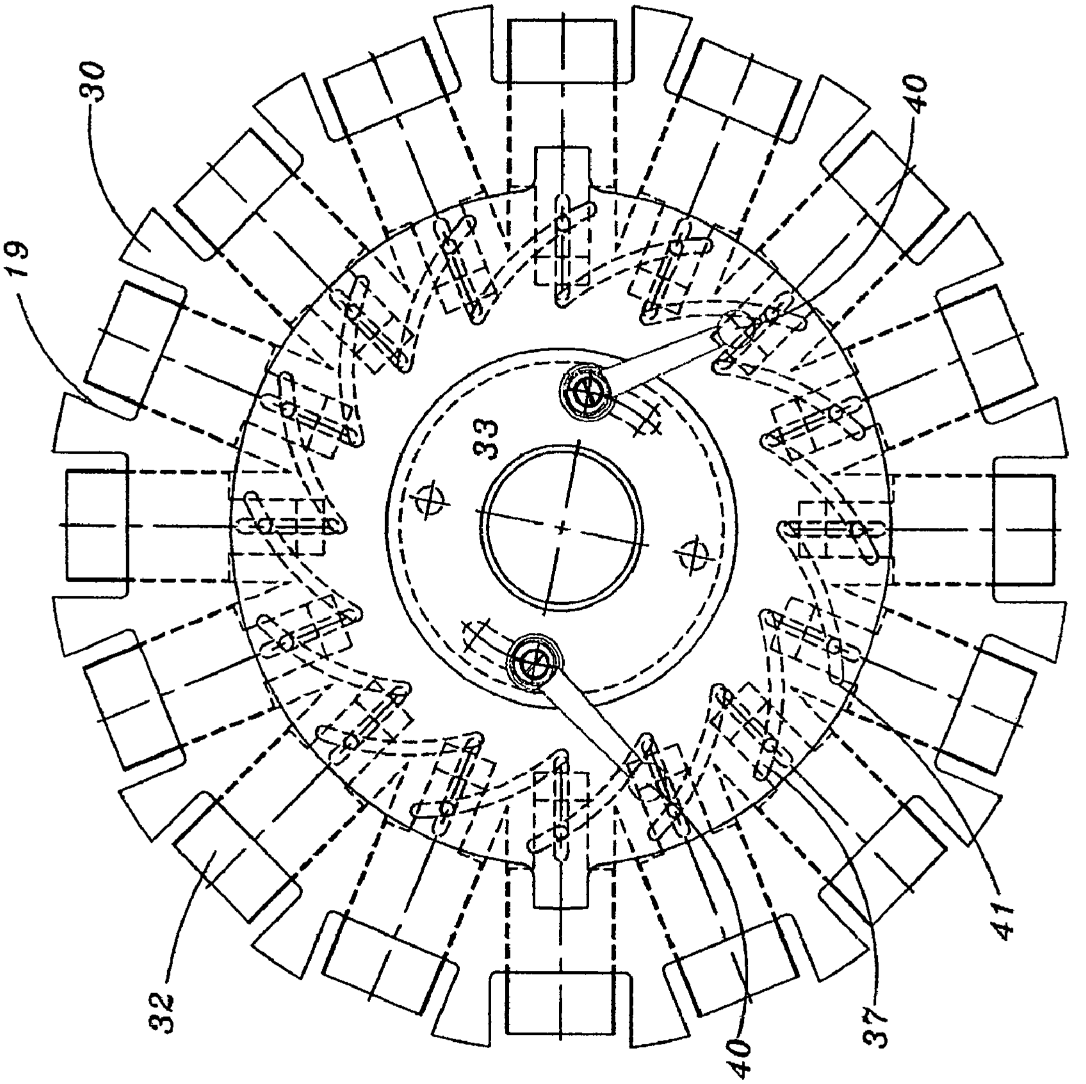
FIG. 4 is an adjustable outsert starwheel with the adjustable outsert support plate adjusted for the outsert thickness in the up position.
Figure 5:
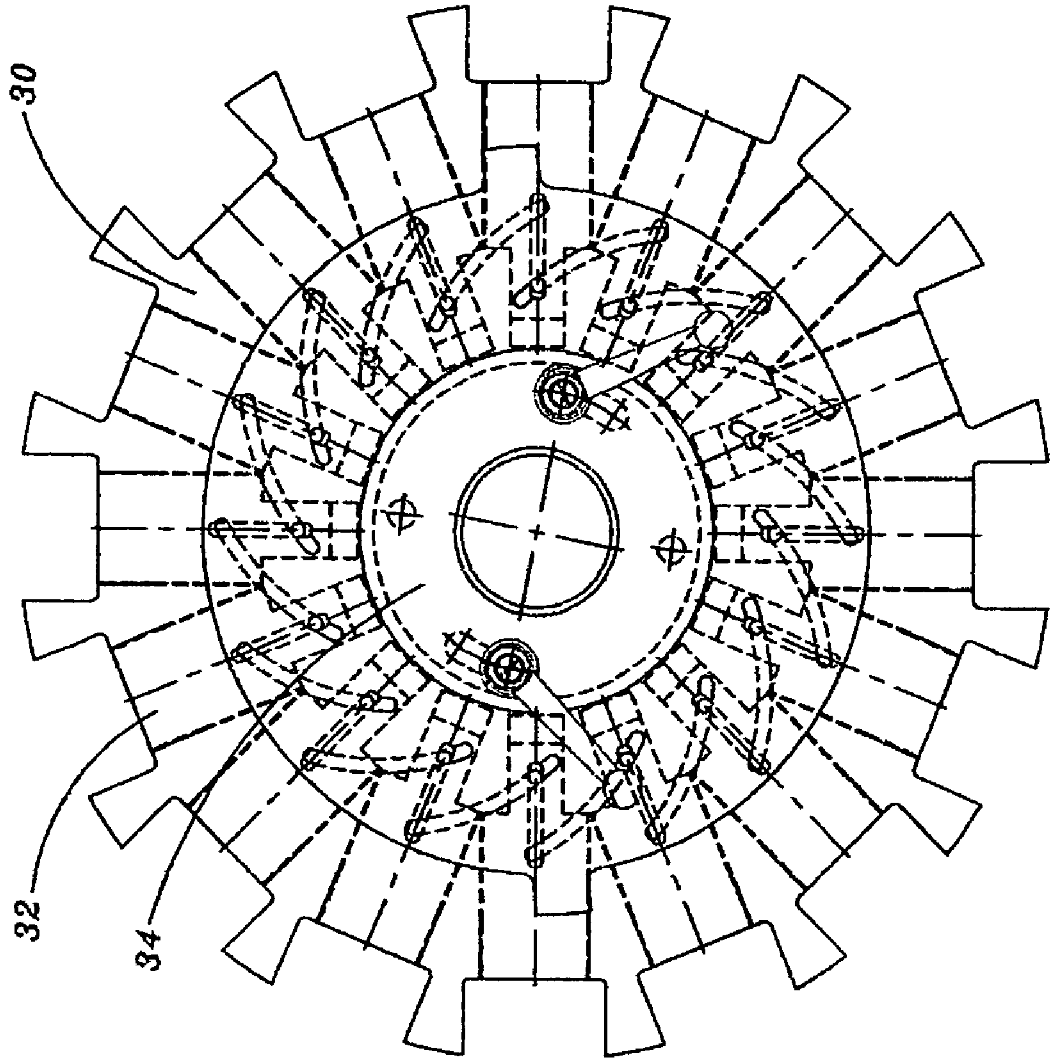
FIG. 5 is an adjustable outsert starwheel with the adjustable outsert support plate adjusted for the outsert thickness in the down position.
Figure 6:
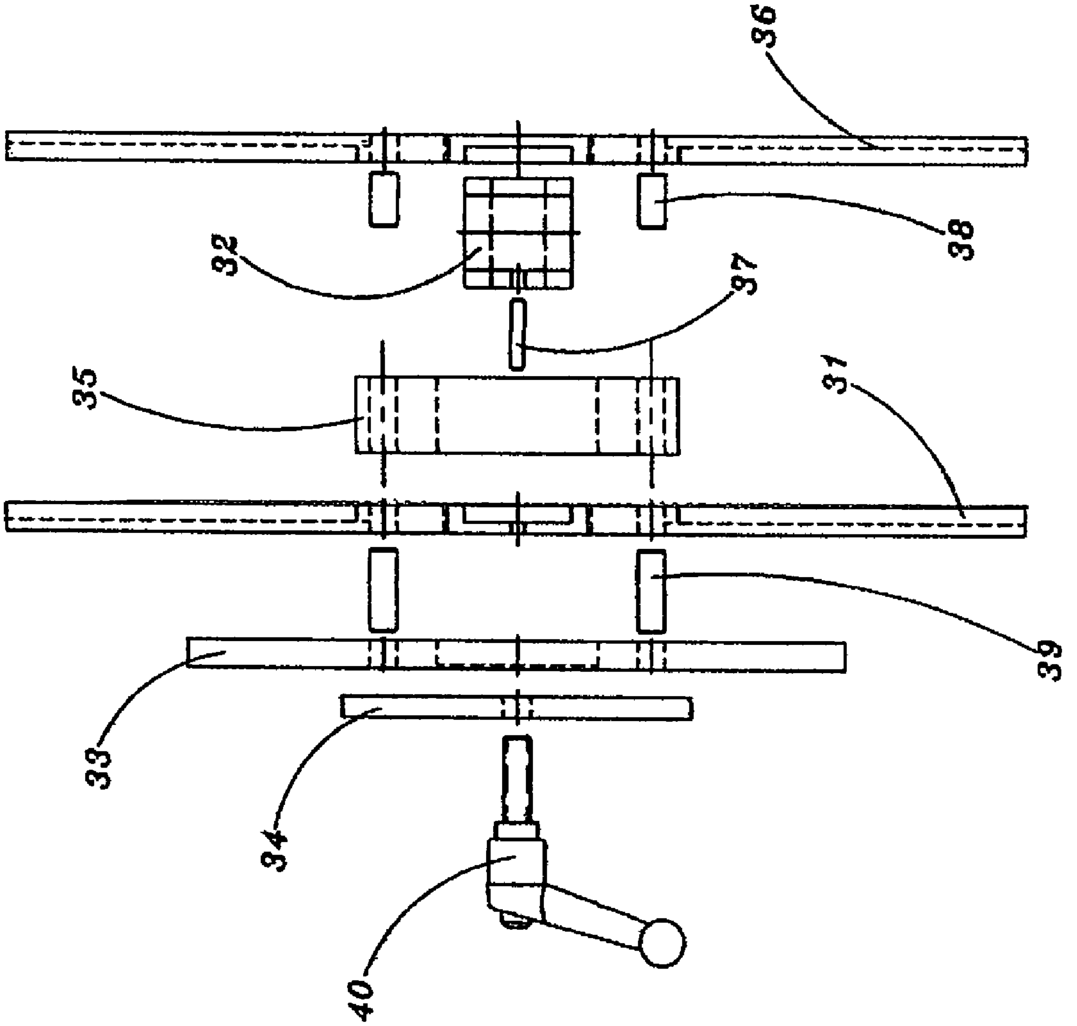
FIG. 6 is an exploded view of the outserter showing the manner of attachment of the adjustable outserter starwheel.
Figure 7:
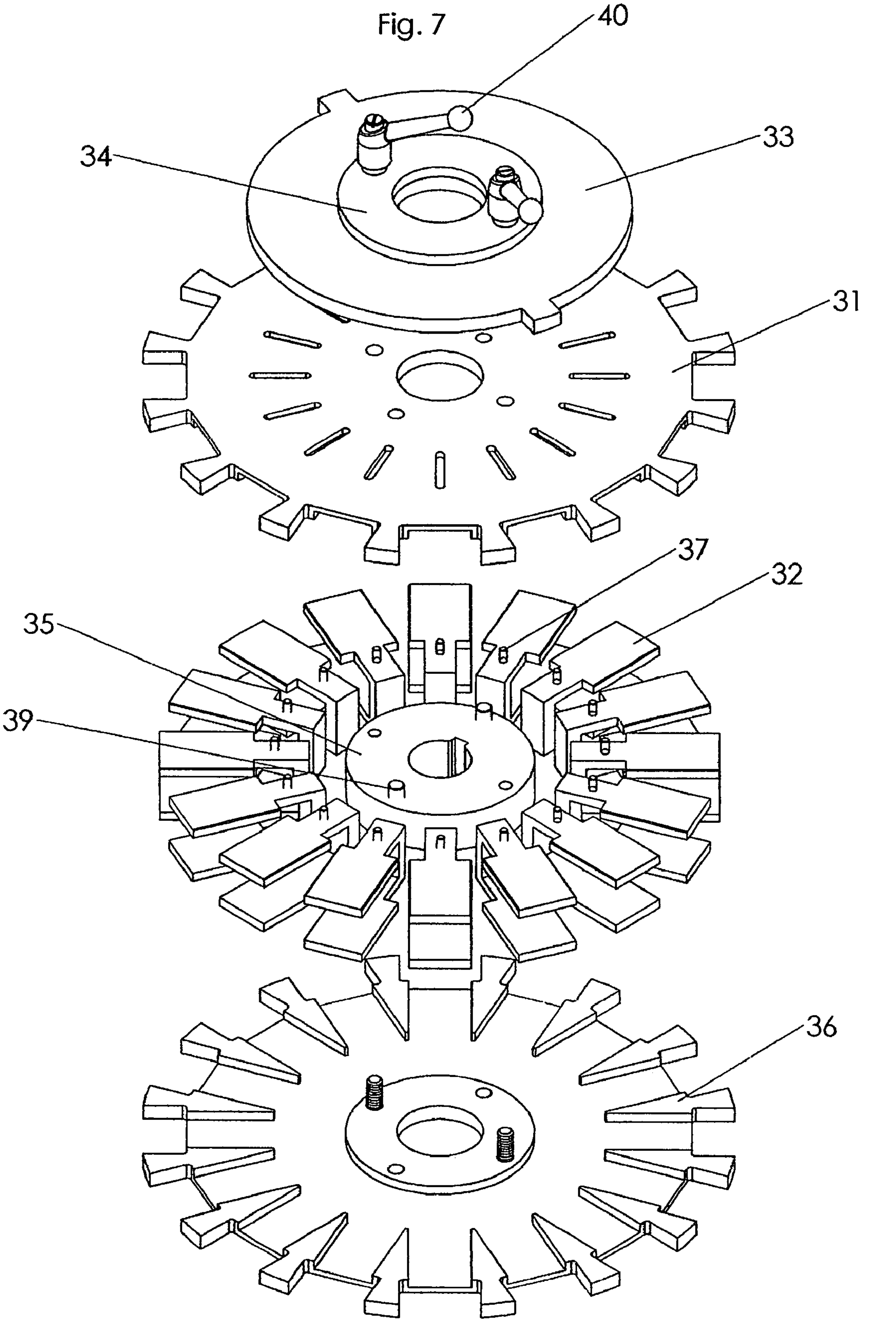
FIG. 7 is a three-dimensional exploded view of the adjustable starwheel when viewed generally downwardly from the clamping handle end of the starwheel.
Figure 8:
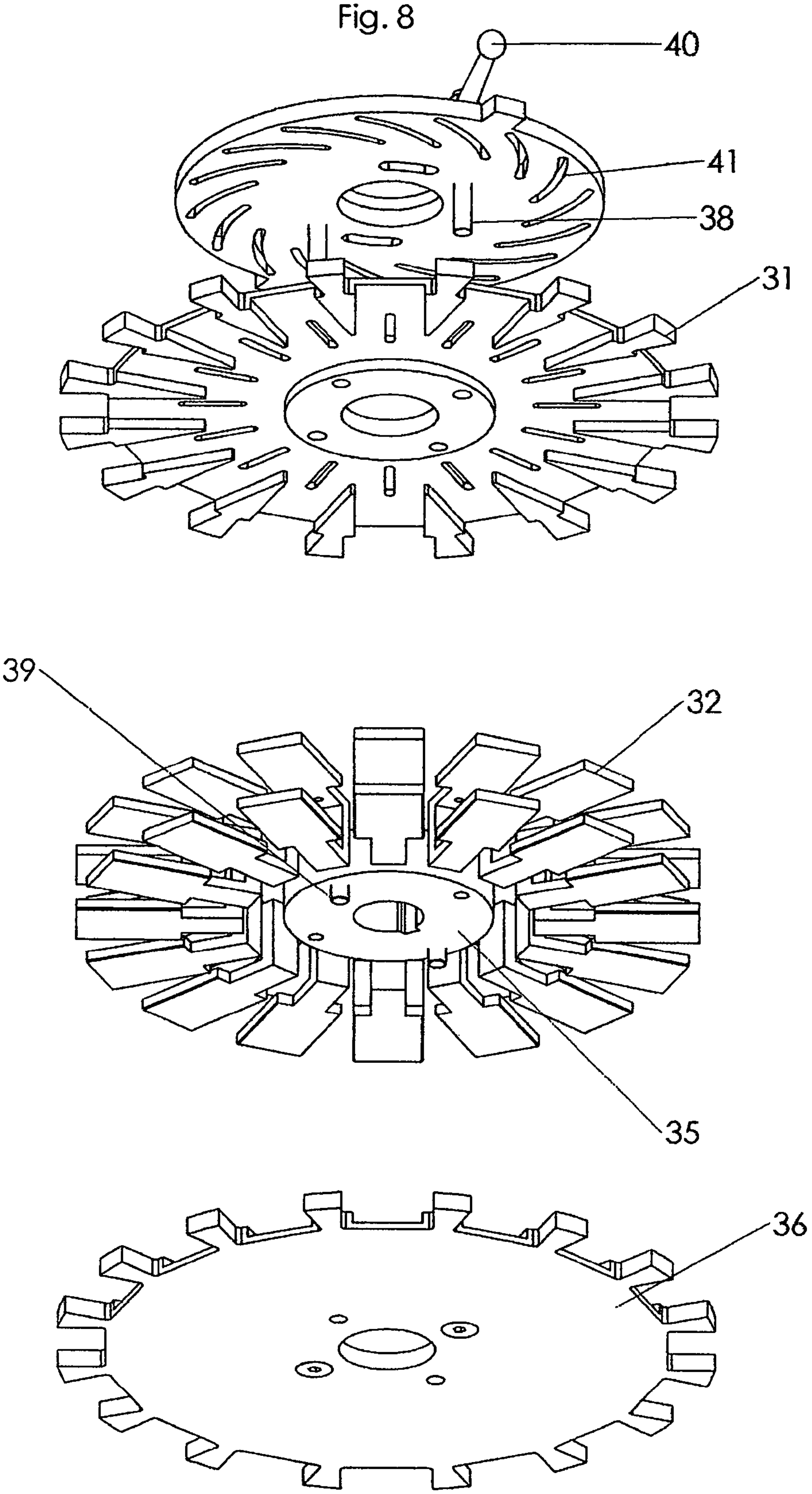
FIG. 8 is a three-dimensional exploded view of the adjustable starwheel when viewed generally upwardly from the rear starwheel plate end of the starwheel.

A new preferred embodiment to the previous star wheel design (15) is an adjustable outsert star wheel (30) shown in FIG. 4. FIG. 4 shows a set of adjustable outsert support plates (32) at the "out" position, which are adjusted for a thin outsert thickness. FIG. 5 shows the adjustable outsert support plates at the "in" position, which are adjusted for fat thickness outserts. The previous star design (15) was limited to one size outsert (8) thickness. Customers had to order 2, 3 or more star wheel assemblies to handle the numerous thickness outserts. If a new outsert thickness were developed for a product, the customer had to order another outsert star wheel. Hence, this new design is capable of handling multiple thickness outserts with one minor adjustment. The star (30) can be made with a variable number of "U" shaped adjustable outsert support plates (32), e.g., 12 or 16. One hardened dowel pin (37) is pressed into each support plate. These support plates are adjusted by engagement of the dowel pins (37) FIG. 7 with the eccentric slots (41), located in the adjustment plate (33) FIG. 8. The dowel pins (37) also pass through straight slots in the front starwheel plate (31). Loosening the two clamping handles (40) and turning the adjustment plate (33) moves all support plates simultaneously, which aids in a quick adjustment from one thickness outsert to the next. Simultaneous movement also creates equal support plate positioning ensuring that only one outsert is extracted from the feeder mechanism (16) at a time. The support plates (32) are trapped between the front star wheel plate (31) and the rear star wheel plate (36). Each star wheel plate has pockets in which the support plates (32) travel. The front star wheel plate (31) is aligned with spacer (35) and the rear star wheel plate (36) utilizing two long hardened dowel pins (39) and two short hardened dowel pins (38). Precise alignment between the front and rear star wheel plates is critical for the proper movement of the support plates.

The outsert pocket (19) drives the outserts (8) out of the feeder mechanism (16). This star wheel (30) is retrofitable to any previous designed outserter (7) in the field.

While the invention has been illustrated with the preferred embodiment with the outsert placer coacting with a rotary labeling machine, the adjustable outsert starwheel is readily adapted by routine engineering to the other common labeling machines such as the in-line labelers without losing the advantages including equipment simplification provided by the present invention. Similarly, this adjustable starwheel can be used in place of any starwheels used for indexing products of differing sizes without the necessity of having a separate indexing starwheel for each product size.

What is claimed:

1. A star wheel device having pockets for the indexing of items as part of a manufacturing process which can be adjusted to permit the indexing of manufacturing parts of varying sizes comprising, in combination:

(a) a star wheel adjustment plate having an outer surface and an inner surface, said inner surface provided with slots generally oriented eccentrically relative to a radius of said adjustment plate, and having a number and spacing corresponding generally to the number and spacing of the pockets of the star wheel, said eccentric slots adapted to receive a dowel pin in slidable relationship;

(b) a first star wheel plate having a first generally planar surface positioned adjacent to the inner surface of said adjustment plate and having radial slots passing there through adapted to receive a dowel pin in slidable relationship, and having a number and spacing of said radial slots corresponding generally to the number and spacing of the star wheel device pockets, the second side of said star wheel plate having affixed thereto affixed guides partially defining a fixed set of opposing sides for each pocket;

(c) a cylindrical spacer;

(d) generally U-shaped spacer plates equal in number to the number of pockets in the star wheel device, and positioned in surrounding relationship to said cylindrical spacer with the closed end of the U directed toward said cylindrical spacer, and the legs of said U defining a second set of opposing sides for each pocket, each of said spacer plates on the side adjacent to said first star wheel plate provided with a dowel with a pin adapted to be inserted into and through one of the radial slots of the first star wheel plate and into one of the eccentric slots of said adjuster plate, in slidable relationship with both of said slots;

(e) a second star wheel plate having a first side adapted to be positioned adjacent to said cylindrical spacer and the surrounding support plates, and a second, generally planar side, said first side having affixed thereto fixed guides partially defining the balance of said first set of opposing sides for each pocket;

(f) clamping means operatively and releasably connecting said adjustment plate with said second star wheel plate through openings in said first star wheel plate and through the cylindrical spacer;

(g) means for keying the first star wheel plate and the second star wheel plate with said cylindrical spacer so that when the clamping means is fully actuated, relative motion between those three parts is prevented.

2. The star wheel device in accordance with claim 1 in which said star wheel device is an outserter placer in combination with a labeling machine.

* * * * *